United States Patent
Turner

[11] Patent Number: 5,995,392
[45] Date of Patent: Nov. 30, 1999

[54] CURRENT LIMITER

[75] Inventor: Michael James Turner, Leeds, United Kingdom

[73] Assignee: Switched Reluctance Drives Limited, Harrogate, United Kingdom

[21] Appl. No.: 08/986,053

[22] Filed: Dec. 5, 1997

[30] Foreign Application Priority Data

Dec. 6, 1996 [GB] United Kingdom ............. 9625434

[51] Int. Cl.⁶ .................................................. H02H 9/00
[52] U.S. Cl. ............................. 363/49; 323/908; 361/58
[58] Field of Search .............. 363/49, 77; 323/294, 323/908; 361/58, 91.5

[56] References Cited

U.S. PATENT DOCUMENTS

| | | | |
|---|---|---|---|
| 3,112,435 | 11/1963 | Barney | 361/58 |
| 3,935,511 | 1/1976 | Boulanger et al. | 317/20 |
| 4,450,496 | 5/1984 | Doljack et al. | 361/58 |
| 4,652,963 | 3/1987 | Fahlen | 361/58 |
| 4,769,752 | 9/1988 | Rackowe | 363/56 |
| 5,187,653 | 2/1993 | Lorenz | 363/89 |
| 5,305,174 | 4/1994 | Morita et al. | 361/58 |
| 5,350,997 | 9/1994 | Ghotbi et al. | 363/49 |
| 5,420,780 | 5/1995 | Berstein et al. | 323/908 |
| 5,574,632 | 11/1996 | Pansier | 363/49 |
| 5,737,160 | 4/1998 | Duffy | 361/58 |
| 5,737,161 | 4/1998 | Thomas | 361/58 |

FOREIGN PATENT DOCUMENTS

| | | |
|---|---|---|
| 1 375 605 | 11/1974 | United Kingdom . |
| 2 300 982 | 11/1996 | United Kingdom . |
| WO 97/10635 | 3/1997 | WIPO . |
| WO 97/10637 | 3/1997 | WIPO . |

OTHER PUBLICATIONS

Ellegård, Kristen, "Inrush Current Limiter," Electronics World and W.W., Jul. 1994, p. 601.

*Primary Examiner*—Adolf Deneke Berhane
*Attorney, Agent, or Firm*—Patterson & Keough, P.A.

[57] ABSTRACT

A current limiter for a rectifier circuit includes a fixed resistor 50 and a positive temperature coefficient (PTC) resistor 100 connected in series across a control switch 70. The control switch is connected between a rectifier output and a smoothing capacitor 20. If the switch fails to operate, the PTC resistor heats up, increasing its resistance in the presence of an abnormal current. The increased resistance will limit the current supplied to the rectifier output terminals 40.

15 Claims, 3 Drawing Sheets

CURRENT LIMITER

BACKGROUND OF INVENTION

1. Field of Invention

This invention relates to current limiters, and particularly, but not exclusively, to current limiters for rectified power supplies.

2. Description of Related Art

FIG. 1 shows a rectifier circuit for converting an alternating current (a.c.) input into a rectified and smoothed direct current (d.c.) output. The circuit comprises a bridge rectifier 10 which produces a full-wave rectified output from the a.c. input which is applied across terminals 30. The full wave rectified output of rectifier 10 is smoothed by means of a capacitor 20 to provide the circuit output across terminals 40. In a practical application, a load requiring a d.c. input would be connected across the terminals 40.

When the a.c. supply is first switched on, the capacitor 20 is uncharged and a very high current is initially drawn as the capacitor charges. This in turn may damage the components of the circuit, particularly the diodes of the rectifier 10. In addition, the current surge reflected into the supply is often unacceptable. In order to prevent this, it has been proposed to connect a switch in the circuit between the rectifier and the capacitor, with a resistor in parallel with the switch. Such a circuit is shown in FIG. 2. The switch 70 is held open when the a.c. supply is switched on, and the rectified current is then forced to flow through the resistor. Thus, only a proportion of the total e.m.f. available is dropped across the capacitor 20, thereby limiting the amount of current drawn as the capacitor charges. After a period, the voltage across the capacitor rises to some suitable level as the capacitor charges and the switch can be closed. This process is commonly called 'soft starting'. A modification of this well-known arrangement is shown in U.S. Pat. No. 5,087,871, which is incorporated herein by reference.

One problem with such a circuit is that if the capacitor 20 is faulty, the charge it stores may never be sufficient to create a significant voltage drop across it. Alternatively, the load to which the circuit output at the terminals 40 is connected may malfunction, causing abnormally large currents to be drawn and preventing the normal working voltage across the capacitor from being established. In either case, the high current drawn through the resistor 50 will not decrease sufficiently to allow the switch 70 to be closed. Significant current will then be drawn through the resistor 50 for a prolonged period, causing it to get very hot and at least pose a fire risk if not actually to catch fire itself.

A second problem is that the switch 70 may become stuck in the open circuit condition. This would also cause the normal load current to flow through the resistor for extended periods with the associated fire risk.

A further problem is that users of the equipment may cause the resistor 50 to overheat by repeatedly discharging the capacitor, then charging again using this circuit. The resistor 50 will typically be chosen to comfortably accommodate the energy dissipated in one charging cycle. However, it then requires a significant period of time to cool before the charging sequence can be repeated. Repeated cycling (e.g. by the user switching the input on and off too rapidly and repeatedly) may cause the resistor to overheat.

European published patent application number 667666, which is incorporated herein by reference, shows a circuit having detection means which detects if the switch is closed prior to switching on the a.c. supply to the rectifier 10. If it is, the circuit is prevented from operating. Although this arrangement precludes high start-up currents from occurring accidentally, it does not address the more serious problem which arises when, for example, the capacitor is unable to store charge properly or a load draws excessive current, nor when the switch is unable to close in the first place.

It is an object of the present invention to provide a circuit which at least alleviates these problems of the prior art.

SUMMARY OF THE INVENTION

According to embodiments of the present invention there is provided a current limiter comprising first and second terminals, a first resistor connected in series with a second resistor between the terminals, and switch means connected in parallel with the resistors between the terminals, characterized in that the second resistor is a thermistor having a positive temperature coefficient, the thermistor being responsive to an abnormal current, above a working current through the resistors, while the switch means is open, to cause its resistance to increase, thereby limiting the magnitude of the current above the working current.

It will be realized that this circuit uses the PTC thermistor in an unconventional way. Normally the PTC thermistor is expected to cycle over a resistance range in response to a working current. By contrast, in the circuit of embodiments of the present invention, the PTC thermistor is designed to pass the initial working current, which will include an initial surge current, without any significant change in resistance. It is only if a fault occurs in the components associated with the circuit, or if the circuit is operated in such a way that damage due to prolonged exposure to excessive currents occurs, that the PTC thermistor will react and reduce the current to a safe level.

It will be appreciated that the components of the circuit of FIG. 3, described in more detail below, will be rated according to an expected working current. The invention provides protection for the circuit in the presence of an abnormal current, for example a fault current or, in the event of abnormal operation by a user, an excessive current for a prolonged period.

The thermistor provides a backup protection for the first resistor in the event that the switch fails to close when required to do so. Any prolonged exposure to the high current causes the thermistor to heat up such that its resistance rises rapidly and limits the current flowing in the circuit. The thermal inertia of the thermistor may also assist in alleviating the problem of repeated cycling of the circuit. Multiple charging operations with insufficient cooling intervals between them will cause the PTC thermistor temperature to rise to the point where its resistance increases sharply, thereby again protecting the resistor 50 from overheating.

A PTC thermistor is typically a semiconductor device, including barium titanium oxide. Other types are also available. They are supplied by electronic component manufacturers, e.g. Philips Components Limited, London, England as the 2322 Series of PTC resistors. A PTC resistor is distinguished from a standard wire-wound or carbon resistor by having an initially relatively low resistance which rises rapidly with temperature.

The switch may for example be a relay, a thyristor or other semiconductor switching device.

Preferably, the switch is arranged to close once the magnitude of the current surge has subsided and the voltage across capacitor 20 has reached a predetermined value. Once the current surge has passed, closing the switch provides a short circuit for the current, substantially preventing it from flowing through the resistors which could otherwise overheat. The PTC thermistor acts to prevent overheating of the first resistor when the switch is open if there is a current surge of a magnitude, duration or frequency greater than that for which the resistor is rated, i.e. if the integral of the thermal energy associated with the current is excessive.

Preferably, the thermistor is in a heat-exchange relationship with the resistor, so that the heat from the resistor increases the responsiveness of the thermistor.

The current limiter according to embodiments of the invention is suitable for many circuits, such as, for example, a rectifier circuit comprising a rectifier having an a.c. input and a rectified output, output terminals, and a capacitor connected in parallel with the output terminals. The current limiter is arranged between the rectifier and one of the output terminals. The other output terminal is connected with the other rectifier terminal. This circuit may supply a variety of loads from its output terminals, such as a switched reluctance motor through an appropriate switching circuit.

Also according to embodiments of the invention, there is provided a method of limiting an abnormal current above a working current in an electrical circuit comprising switch means connected in parallel with a first resistor between first and second terminals, the method comprising connecting a thermistor having a positive temperature coefficient in series with the first resistor between the first and second terminals, the thermistor being substantially unresponsive to the working current such that its resistance remains relatively low, and being responsive to the abnormal current through the first resistor to cause its resistance to increase, thereby limiting the magnitude of the current, above the working current, through the first resistor.

BRIEF DESCRIPTION OF THE DRAWINGS

The present invention can be put into practice in various ways, some of which will now be described by way of example with reference to the accompanying drawings in which.

DETAILED DESCRIPTION OF PREFERRED EMBODIMENTS

Figure 2:
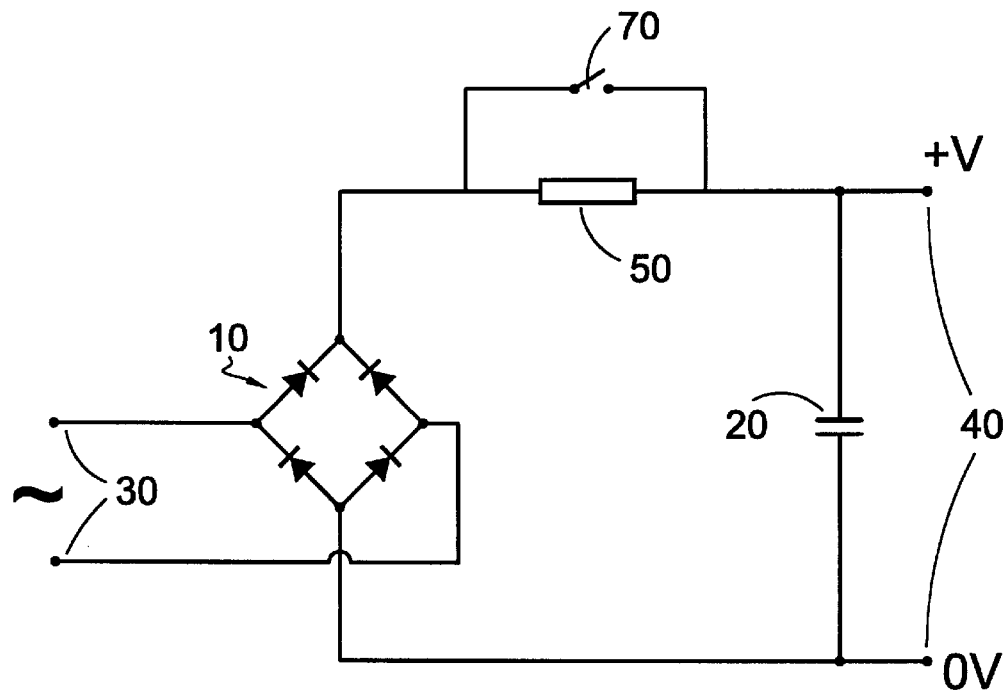
FIG. 2 shows a known rectifier circuit with a current limiter.
Figure 3:
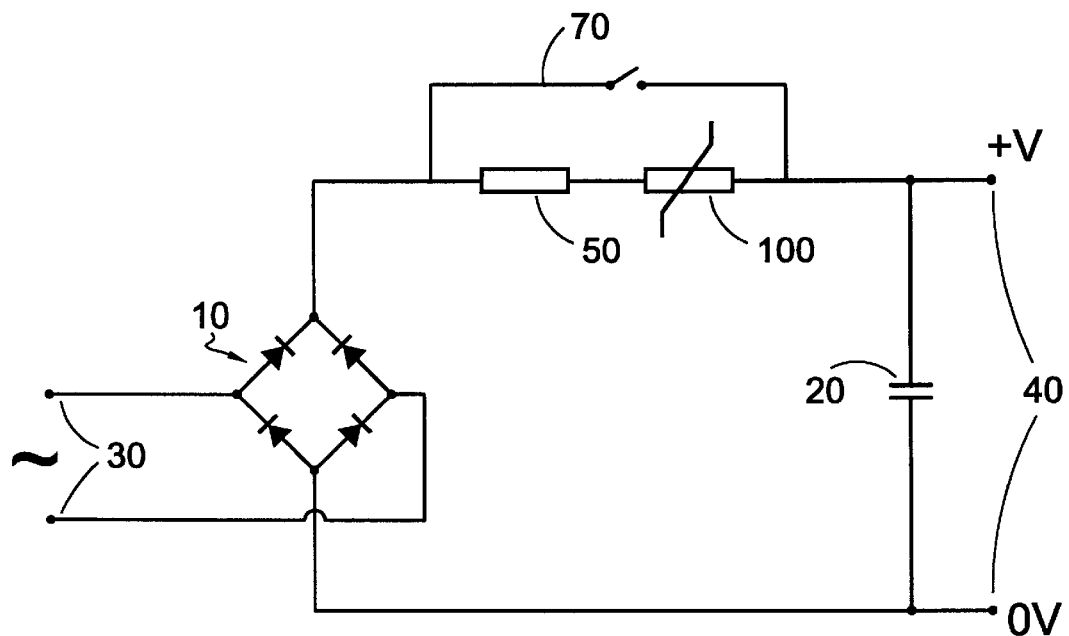
FIG. 3 shows a rectifier circuit having a current limiter according to an embodiment of the present invention.

Referring to FIG. 3, a rectifier circuit is shown. Those components common to FIGS. 1–4 have been labelled with like numerals.

Figure 1:
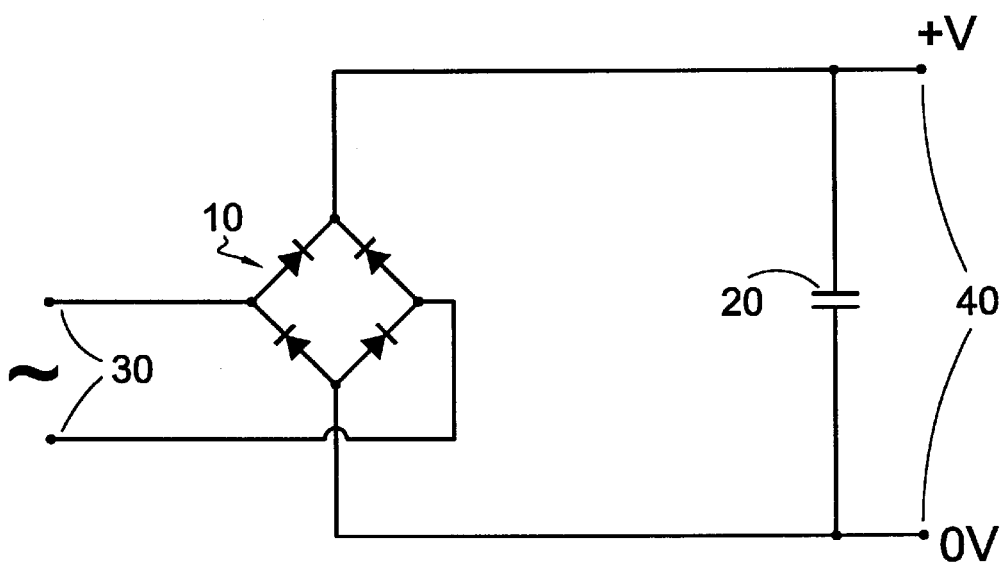
FIG. 1 shows a prior art rectifier circuit.

As with the prior art circuits of FIGS. 1 and 2, a.c. input terminals 30 are connected with the input to a full-wave rectifier 10 in the form of a diode bridge. One of the outputs of the rectifier bridge 10 is connected directly to one circuit output terminal 40. The other output of the rectifier is connected to the other circuit output terminal 40, via serially connected first and second resistors 50, 100. In parallel with these two resistors is a switch 70, which is typically a semiconductor device, such as a bipolar transistor or thyristor, or an electromechanical switch, such as a relay.

A capacitor 20 is connected across output terminals 40 for smoothing the output voltage of the rectifier 10. In this embodiment the rectifier 10 is capable of handling 8 A at 230V from an a.c. supply, producing a rectified and smoothed d.c. output of about 5 A at about 320 volts. The capacitor is typically about 4700 μf, 350 volts rating.

The first resistor 50 is a wire-wound resistor or the like of about 47Ω. The second resistor 100 is a positive temperature coefficient (PTC) thermistor or other PTC device exhibiting the appropriate temperature/resistance response. Typically the thermistor is a 2322 661 4111 type manufactured by Philips Components Limited, having a resistance of about 3Ω at about 25° C. and having a trip current threshold of about 615 mA at about 25° C. Under normal circumstances, the circuit operates substantially as described above in connection with FIG. 1 as far as rectification is concerned. However, when the a.c. supply 30 is first switched on, the capacitor 20 is initially uncharged and, at this time, the first resistor 50 has a much larger resistance than the second resistor 100. It is predominantly the first resistor 50, therefore, that limits the current drawn by the capacitor 20 and, thus, the amount of current drawn from the supply. Provided none of the components are faulty, the switch 70 is closed as soon as a sufficient charge is stored in the capacitor 20, thereby creating a short circuit around the resistors 50, 100.

If the switch 70 fails to close at this time when, for example, the capacitor is faulty, or the current drawn at the circuit output 40 is excessive or the switch is faulty, a non-negligible current will instead continue to flow through the pair of resistors 50, 100. The current flowing through the PTC thermistor 100 causes it to heat up, thereby increasing its resistance significantly. The change in resistance of the PTC thermistor 100 for even moderate resistive heating is sufficiently high to decrease the current being drawn through the resistors to a safe value.

Even if the switch 70 is damaged and unable to close, the PTC thermistor 100 is able to withstand the steady-state current passing through it for prolonged periods without risk of catching fire. The self heating this causes increases the PTC thermistor's resistance to a high enough level that the voltage dropped across the first resistor 50 is small. Thus the risk of this first resistor catching fire is also substantially reduced. Repeated charging operations, which would otherwise cause the first resistor 50 to overheat, likewise result in heating of the PTC thermistor 100, which again protects the current by increasing its resistance, and preventing further high charging currents from flowing until both the resistor 50 and (by implication) the PTC thermistor 100 have cooled to a safe temperature.

The switch 70 should ideally be closed when the voltage across capacitor 20 equals the peak of the rectified supply voltage and the current through the soft-start resistor 50 has, in the absence of any load current, dropped to zero. A number of methods for closing the switch are possible, each having different approximations to the ideal.

The closing of the switch 70 can simply be timed, by any known method, from the moment current is drawn between the terminals. Electronic and electromechanical timers could be used. Where the switch 70 is a relay, a relay with a built-in timer for energizing the coil can be used. This approach is simple to implement but does not cater for any extended charging time required by the capacitor 20.

A second method is to measure the voltage across the capacitor 20 and wait for it to reach a predetermined threshold. When the threshold voltage is met, the closing of the switch is triggered. It is possible to use the capacitor voltage directly to operate the coil of a relay which constitutes the switch 70. This second method is simple but does not cater for wide variations in supply voltage and, if the supply is particularly high, results in premature closure of the switch while charging current is still flowing.

A third method overcomes the drawbacks of the first two methods by combining them and allowing a sensed voltage to trigger a subsequent timed period.

It would be possible to measure the current in the capacitor 20 and to close the switch 70 when charging current falls below a predetermined value. While it is possible to sense the voltage across the resistor 50 as a measure of capacitor current, this measurement does not differentiate between capacitor and load current. If significant load current is flowing, then the voltage across the resistor 50 may never fall to the threshold value and the switch 70 will not be closed. It is therefore preferable to measure the true capacitor current, but if this is done by inserting a resistor in series with the capacitor across the DC link, there is an ongoing power loss in the resistor. A non-invasive current transducer must therefore be preferable for accuracy.

Figure 4:
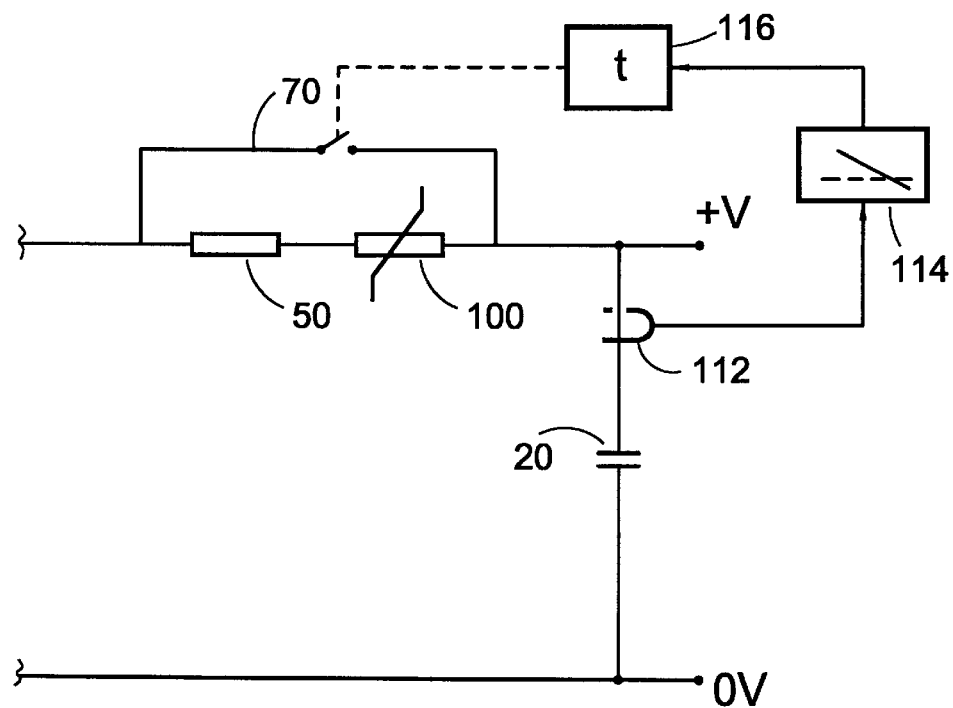
FIG. 4 shows a current-limiting portion of a rectifier circuit, according to an embodiment of the present invention.

FIG. 4 illustrates an automated switching arrangement based on the circuit of FIG. 3 in which the capacitor current is monitored by a Hall-effect device 112. When the current value, as relayed by the device 112, passes a suitable predetermined threshold, a threshold detector 114 outputs an actuation signal to a delay timer 116. The timer 116 relays the actuation signal to close the switch 70 after the predetermined delay period.

In an alternative embodiment, the two resistors 50, 100 can be physically coupled together, the resistive heating of the resistor 50 then combining with the resistive heating of the PTC thermistor 100 to raise the resistance of the latter more quickly. Further, a diode can be placed in series with the two resistors 50, 100, also in parallel with the switch 70, to prevent the capacitor 20 discharging in the opposite direction to the current flow.

Figure 5:
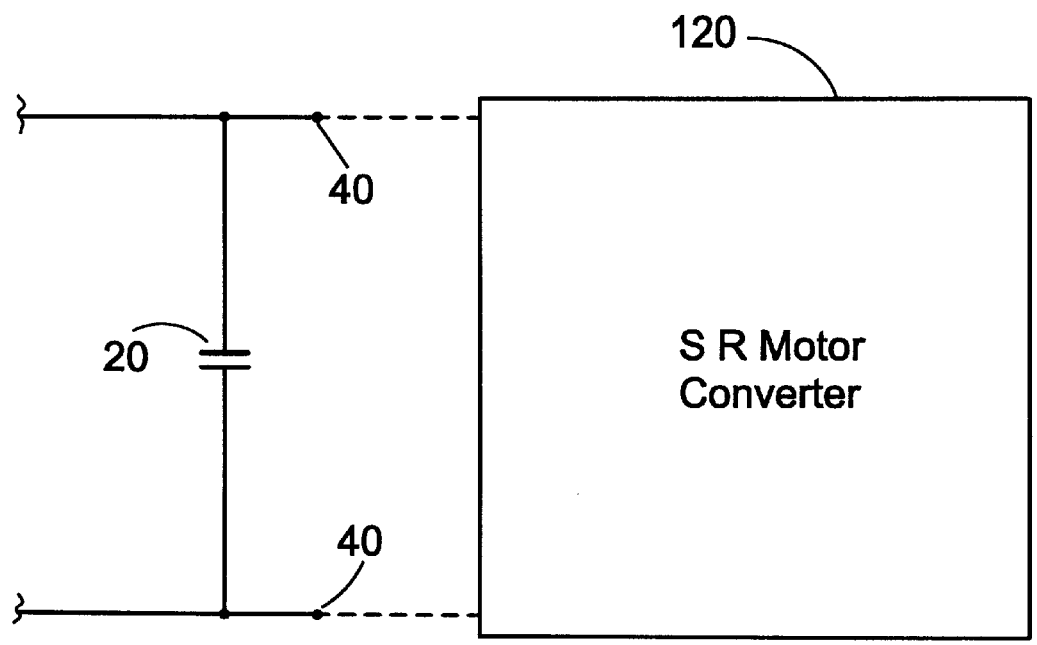
FIG. 5 shows output terminals connected to a switched reluctance motor converter, according to an embodiment of the invention.

A rectifier circuit incorporating such a current limiter will operate with any load attached to the circuit output 40, but is particularly suited to a switched reluctance motor converter, as shown schematically in FIG. 5. Other suitable loads are a switched mode power supply or a variable frequency inverter.

While the invention has been described with reference to rectifier circuits, it will be understood that the current limiter could find application in many different circuits where it is desirable to limit current spikes, either on start-up or during normal operation. In the latter case the switch 70 would be opened once the current being drawn from the supply exceeded a predetermined value, and would not be closed again until the current dropped below this value once more.

Those skilled in the art will recognize that various modifications and changes may be made to the present invention. Accordingly, the above description of several embodiments is made by way of example and not for purposes of limitation. The present invention is intended to be limited only by the spirit and scope of the following claims.

What is claimed is:

1. A d.c. current limiter for producing d.c. output, the d.c. current limiter comprising first and second terminals, a first resistor connected in series with a second resistor between the terminals, and switch means connected in parallel with the resistors between the terminals, characterized in that the second resistor is a thermistor having a positive temperature coefficient, the thermistor passing current such that it is responsive to an abnormal current, above a working current through the resistors, while the switch means is open, to cause the resistance of the thermistor to increase, consequently limiting the magnitude of the d.c. current between the terminals above the working current, the thermistor also passing initial working current, including an initial surge current, without significant change in resistance.

2. A current limiter as claimed in claim 1, in which the switch means comprises at least one of a relay and a semiconductor device.

3. A current limiter as claimed in claim 1, in which the switch means is arranged to close once the magnitude of the current has dropped to a predetermined value.

4. A current limiter as claimed in claim 1, in which the second resistor is in a heat-exchange relationship with the first resistor.

5. A current limiter as claimed in claim 1, wherein the thermistor has a resistance of about $3\Omega$ at about 25° C.

6. A current limiter as claimed in claim 5, wherein the thermistor has a trip current threshold of about 615 mA at about 25° C.

7. A rectifier circuit comprising a rectifier having an alternating current (a.c.) input and a rectified output, a pair of output terminals, a capacitor connected across the output terminals, and a current limiter connected between the rectifier output and one of the output terminals, the current limiter comprising a first resistor connected in series with a second resistor between the terminals and a switch connected in parallel with the resistors between the terminals, characterized in that the second resistor is a thermistor having a positive temperature coefficient, the thermistor passing current such that it is responsive to an abnormal current, above a working current through the resistors, while the switch is open, to cause the resistance of the thermistor to increase, consequently limiting the magnitude of the current above the working current, the thermistor also passing initial working current, including an initial surge current, without significant change in resistance.

8. A circuit as claimed in claim 7, in which the output terminals are connected to a switched reluctance motor converter.

9. A circuit as claimed in claim 7, further comprising a monitoring device for monitoring capacitor current.

10. A circuit as claimed in claim 9, wherein the monitoring device comprises a Hall-effect device.

11. A circuit as claimed in claim 9, further comprising a threshold detector operably coupled to the monitoring device to indicate when capacitor current exceeds a predetermined threshold.

12. A circuit as claimed in claim 11, further comprising a delay timer operably coupled to the threshold detector for closing the switch once a predetermined delay period has passed after the capacitor current exceeds the predetermined threshold.

13. A method of limiting an abnormal current above a working d.c. current in a d.c. electrical circuit comprising switch means connected in parallel with a first resistor between first and second terminals, the method comprising:

connecting a thermistor having a positive temperature coefficient in series with the first resistor between the first and second terminals, the thermistor being substantially unresponsive to the working d.c. current such that its resistance remains relatively low, and passing current such that it is responsive to the abnormal current through the first resistor to cause its resistance to increase, the thermistor also passing initial working current, including an initial surge current, without significant change in resistance; and consequently limiting the magnitude of the current, above the working d.c. current between the terminals, through the first resistor.

14. A rectifier circuit comprising a rectifier having an alternating current (a.c.) input and a rectified output, a pair of output terminals connected to a switched reluctance motor converter, a capacitor connected across the output terminals, and a current limiter connected between the rectifier output and one of the output terminals, the current limiter comprising a first resistor connected in series with a second resistor between the terminals and a switch connected in parallel with the resistors between the terminals, characterized in that the second resistor is a thermistor having a positive temperature coefficient, the thermistor passing current such that it is responsive to an abnormal current, above a working current through the resistors, while the switch is open, to cause the resistance of the thermistor to increase, consequently limiting the magnitude of the current above the working current, the thermistor also passing initial working current, including an initial surge current, without significant change in resistance.

15. A circuit as claimed in claim 14, wherein the working current is a working d.c. current.

\* \* \* \* \*

UNITED STATES PATENT AND TRADEMARK OFFICE
CERTIFICATE OF CORRECTION

PATENT NO. : 5,995,392
DATED : November 30, 1999
INVENTOR(S) : Michael J. TURNER It is certified that error appears in the above-identified patent and that said Letters Patent is hereby corrected as shown below:

Item [56],
Title page of the patent, the following references should appear in the "References Cited"

US PATENT DOCUMENTS 5,087,871 2/1992 Losel.

FOREIGN PATENT DOCUMENTS 0 667 666 A1 8/1995 Europe.

Signed and Sealed this

Twenty-fifth Day of July, 2000

Attest:

Q. TODD DICKINSON

Attesting Officer

Director of Patents and Trademarks